Patented Mar. 9, 1943

2,313,677

UNITED STATES PATENT OFFICE 2,313,677

MANUFACTURE OF SULPHURIC ACID

John V. Shinn, Flushing, N. Y., assignor to General Chemical Company, New York, N. Y., a corporation of New York No Drawing. Application June 3, 1941, Serial No. 396,404

8 Claims. (Cl. 23—172)

This invention is directed primarily to methods for concentrating relatively weak sulphuric acid containing organic froth promoting constituents.

In certain industrial processes there are produced large quantities of low strength sulphuric acid containing organic froth promoting agents and also variable amounts of carbonizable organic impurities. For example, in the manufacture of alcohols from olefines, olefine containing gas from petroleum cracking stills is contacted with sulphuric acid to form alkyl sulphates. After the acid-gas contacting operation, the reaction product is treated with water or steam to effect hydrolysis of the alkyl sulphates with resultant production of alcohol and sulphuric acid. The alcohol content of the hydrolysis mass is recovered by distillation and condensation, and there remains as residue in the still a sulphuric acid solution of say 40% $H_2SO_4$ strength. This solution, while ordinarily too weak for reuse in treatment of further quantities of olefine containing gas, has a sulphuric acid content too high to permit disposal of the solution to waste. It has been proposed to concentrate this low strength acid by known sulphuric acid concentrating methods to raise the $H_2SO_4$ strength high enough, e. g. to 93% $H_2SO_4$, to permit reuse of the sulphuric acid in the olefine-sulphuric acid contacting step.

Weak sulphuric acid, such as that resulting from the hydrolysis of alkyl sulphates as outlined, contains two groups of organic impurities which substantially interfere with concentration of the acid. Materials of these two groups are complicated hydrocarbons concerning which little definite knowledge has been developed. However, the actual presence and affect of these materials is obvious from the detrimental results obtained during concentration of the initially weak acid up to usable strength. Substances of the first group may be considered as organic froth promoting constituents, and those of the second group may be classed generally as carbonizable organic impurities which, during the acid concentration, become carbonized to such an extent as to form substantial quantities of carbon. Probabilities are there is no sharp line of demarcation between the nature of the organic materials constituting the two groups, although experience shows that on the one hand there are present certain organic constituents which cause excessive frothing, and on the other hand certain organic constituents which, particularly during the latter part of the acid concentrating operation, form carbon as such.

In the concentration of these low strength acids, the frothing phenomenon and formation of carbon solids are highly objectionable from an operating viewpoint. In the case of most of the acids of the kind mentioned practically no operating difficulties are encountered in preliminarily concentrating the acid from its initial low strength, e. g. 30% to 50% $H_2SO_4$, up to around say 55–80% $H_2SO_4$, depending of course upon the nature of the particular acid being treated. However, at $H_2SO_4$ strengths somewhere between the upper limit of such preliminary concentration and the ultimate $H_2SO_4$ strength desired, e. g. 90–98% $H_2SO_4$, the acid being concentrated passes through a stage or phase in which frothing is excessive. It should be understood that the $H_2SO_4$ strengths within which such acids froth are not fixed but vary in accordance with the particular composition of the individual acid solution. Frothing is an operating disadvantage because as a rule frothing is so great that in the case of a batch concentrating operation froth overflows the concentrate vat, and in the case of continuous concentration, feed of acid to the concentrator must be slowed down to such an extent that the concentration operation as a whole becomes of questionable economic value. In addition to the slowing up of the operation, particularly when continuous concentrators are used of the type in which concentration is effected by blowing with hot inert gas, large quantities of sulphuric acid in the form of froth and foam are carried out of the concentrator entrained in the concentrator tail gas.

The difficulties arising from the formation of solid carbon also occur largely after the above mentioned preliminary concentration operation. In the prior art concentrating methods, particularly during the frothing stage and also during whatever concentration is carried out subsequent to cessation of frothing, much of the carbon formed is deposited on the walls and pipe connections of the concentrating apparatus as a hard cake-like coating.

In well-known methods for refining petroleum oils, distillates are treated with strong sulphuric acid, and after agitation and settling there is formed in the treating vessel a lower layer of acid sludge. The sludge is drawn off and hydrolyzed by addition of water or steam. The lower layer formed on settling is known in the oil industry as sludge acid which may have an $H_2SO_4$ strength varying from 25 to 40%. It has previously been proposed to concentrate sludge acid up to strength high enough to permit reuse of the recovered acid for the treatment of further quantities of petroleum distillates for purification purposes. Sludge acids of this kind contain froth forming constituents and other carbonizable organic impurities which are similar to the froth forming and other carbonizable organic compounds present in the weak acids produced by hydrolysis of alkyl sulphates as indicated above and which give rise to similar difficulties during concentration of such sludge acids up to usable $H_2SO_4$ strength.

The principal object of this invention is provision of methods for heating or concentrating sulphuric acid solutions containing organic froth forming constituents and other carbonizable organic impurities by procedure in accordance with which frothing is minimized to any extent desired. The invention also aims to provide improvements by which these acids may be heated or concentrated in such a way that the carbon produced is in a granular condition which does not cake or clog up the heating or concentrating equipment.

In the application of the principles of the invention to concentration of impure sulphuric acid solutions containing organic froth promoting agents, I have found that frothing may be prevented or minimized to a degree desired in any particular operation by maintaining in the impure acid, while the acid is being concentrated thru the frothing stage, the presence of a small amount of treating agent or material of the group consisting of saturated fatty acids, their esters and salts. In addition to the froth formation minimizing characteristics of these materials, I have discovered that such substances possess the further properties of causing other carbonizable organic impurities which, in the usual prior art practice produce hard cake-like carbon accumulations in the concentrating equipment, to take the form of discrete, granular particles which remain readily suspended in the acid undergoing concentration and which do not cake or clog the apparatus or otherwise interfere with the physical operation of concentration. I have also found that the physical and chemical properties and characteristics of the saturated fatty acids, their esters and salts are such that when these materials are used in quantities to minimize frothing to the extent desired, the carbon formed during the concentrating operation is automatically deposited in the granular condition mentioned.

The invention is adapted particularly for use in concentration of impure sulphuric acids resulting from (1) sulphuric acid treatment of hydrocarbons of petroleum origin, "petroleum origin" to be understood as including natural gas, (2) hydrolysis of at least some of the reaction products of such treatment, and (3) the consequent formation of impure sulphuric acid containing froth promoting constituents.

In the preferred embodiment, the invention has especial application in connection with the concentration of weak sulphuric acid resulting from the hydrolysis of alkyl sulphates in the manufacture of alcohols from olefines as outlined above. Other acids which may be treated in accordance with the invention are impure sulphuric acid solutions containing organic froth promoting constituents. Examples of such solutions are the so-called sludge acids mentioned above and produced in large quantities in the petroleum oil refining industry.

The treating agents employed in carrying out the invention are preferably saturated fatty acids, such as stearic acid, acetic acid, iso caproic acid and cerotic acid, and of this group of substances stearic acid is preferred. In place of the fatty acids, their esters such as carnauba wax and bees-wax may be employed, and also salts of saturated fatty acids such as sodium stearate may be used.

In practicing the invention, the sulphuric acid concentrating operation as a whole may be effected by any known process and in any known acid concentrating equipment. Both batch and continuous methods for concentrating sulphuric acid solutions up to $H_2SO_4$ strengths suitable for reuse are familiar in the art. In order to obtain the operating advantages arising from discoveries constituting the basis of this invention, it is only necessary to modify known concentration methods to the extent of making provision for the maintenance in the acid, while undergoing concentration thru the frothing stage, of the presence of a small amount of saturated fatty acids, their esters and salts, or any mixtures of these materials.

The principal feature of the invention is the discovery that saturated fatty acids, their esters and salts possess properties eliminating or minimizing frothing or foaming, and at the same time automatically cause any free carbon formed during the concentrating operation to take the condition of granular, noncaking particles which remain suspended in the acid solution. It should be appreciated that relatively low strength sulphuric acids suitable for treatment by the present invention will vary widely in composition with respect to content of organic froth promoting constituents and other carbonizable organic impurities. For example, it will be understood that two quantities of sulphuric acid solution, obtained from two basically similar methods for making alcohols from olefines, will contain froth forming agents and carbonizable impurities of the same kind, but the amounts of such agents and impurities may vary over a wide range. The same would be true with respect to the so-called sludge acids of the petroleum oil refining industry. Hence, while the types and general characteristics of froth forming agents and carbonizable impurities present in sulphuric acid solutions of the kind discussed are similar, because of the wide variability of the content in such acids of the amounts of froth forming constituents and other carbonizable impurities, it is not possible to indicate herein any fixed instructions as to the quantities of treating agents to be used in carrying out all operations falling within the scope of the teaching of the invention.

To illustrate one general example of practice of the invention, it may be assumed that a weak sulphuric acid solution resulting from hydrolysis of alkyl sulphates in the manufacture of alcohols from olefines has an $H_2SO_4$ content of say 45%. Such acid contains both froth promoting constituents, and other carbonizable organic impurities which, during concentration, are converted to carbon. Prior to concentration, determination of the amounts of froth promoting agents and other carbonizable impurities in the weak acid is not feasible from an operating viewpoint, and is not necessary in order to carry this invention into effect. For purpose of this discussion, it may be assumed that concentration is carried out in a batch operation.

The initial 45% acid is run into a vat and heated in any desired way, for example by blowing suitably heated air thru the acid mass, to effect the desired H2SO4 concentration. As above indicated, in the case of practically all acid solutions, to the treatment of which the invention is directed, there is a preliminary concentrating stage during which practically no frothing difficulties arise, and in this instance it may be assumed that no appreciable frothing takes place until the acid has been concentrated to a strength of about 75% H2SO4. Some of the treating agents used in the practice of the invention are more easily volatilized out of the hot acid than others, and this fact must be taken into consideration in choosing rate and manner of introduction of the treating agent into the acid solution undergoing concentration. For instance, in this example it may be assumed that the particular acid solution being concentrated froths vigorously while being concentrated thru the H2SO4 strength range of 75-90%. As temperatures of the acid mass may get as high as 250° C., it will be seen that if the total amount of treating agent to be used, say acetic acid, were fed into the vat at the time frothing becomes first evident to the operator, most of the treating agent would be volatilized and eliminated from the mass in a relatively short time so that during concentration of say from 80 to 90% H2SO4, there would be no treating agent present in the bath. Accordingly, in practice of the invention it is recommended that in all instances the treating agent be introduced throughout the frothing stage of concentration. On the assumption that the particular acid being concentrated begins to froth at about 75% H2SO4 strength, on initiation of frothing the operator begins to feed into the hot acid small quantities of whatever anti-frothing agent is to be employed. It should be understood that while the acid is in the frothing stage it is not necessary to continuously feed in the treating agent, as the introduction of the total amount of treating agent used may just as well be intermittent as continuous. One increment of the total quantity of treating agent employed may hold down frothing to the extent desired while the acid is concentrating from say 75 to 78% at which time further froth formation may be evident. At this point another quantity of treating agent is added, and thereafter other amounts of treating agent may be added successively as needed, in accordance with the judgment of the operator.

If desired, froth formation may be avoided practically entirely by using a large enough quantity of treating agent. However, depending upon the equipment being used, formation of some froth may be of no disadvantage, in which case the treating agent is added only when indications are that the froth formation is about to exceed a feasible working maximum with respect to the quantity of froth on the top of the acid being concentrated. In the present example, it may be assumed that frothing ceases entirely at about 90% H2SO4 concentration, and when this stage is reached no further addition of treating agent is necessary. Concentration is then carried on in the usual manner until the H2SO4 strength reaches the ultimate limit desired, say 93% H2SO4. In a procedure such as that just described, it will be found that practically all of the carbon present in the final concentrated acid, whether such carbon was formed before, during, or subsequent to the frothing stage is in a granular condition which does not cake on the walls of the concentrating vat or plug the associated pipe lines or valves. It might be said that in some commonly known methods for concentrating sulphuric acid, the necessary quantities of heat needed are brought into the mass being concentrated in the form of heated air or other inert gas charged into the bottom of the vat.

From consideration of the foregoing, it will be seen that the principal features of the invention do not lie particularly in the selection of the quantity of treating agent to be used but rather in carrying out the operation in some physical way, which will be evident to a skilled operator, according to which there will be maintained in the acid while being concentrated thru the frothing stage a sufficient amount of the treating agent to minimize frothing to the degree desired.

The principles of the invention may also be applied in connection with methods for concentrating sulphuric acid in a continuous process. For example, the weak acid to be concentrated may be introduced into the top of a packed or bubble plate tower and flowed downwardly against a rising stream of hot air or other gas introduced at the bottom, the final concentrating acid being withdrawn from the lower end of the tower thru a suitable outlet. In operations of this type, most of the frothing takes place in a particular zone in which the acid is being concentrated thru the H2SO4 strength range conducive to froth formation for that particular acid. In prior operations of this kind, the upper end of the tower is likely to become so filled with froth that a shutdown is often necessary, and in any case large quantities of froth are swept out of the tower with the exit gas and consequently lost. In this type of apparatus, the treating agent of the present invention may be introduced if desired at the top of the frothing zone by means of a suitable controllable feeder, or if the treating agent is miscible with the cold acid it may be mixed with the acid prior to introduction of the acid into the tower. Whether fed into the system either with the cold acid or thru a separate connection on the side of the tower, it will be understood that the operation may be most conveniently carried out by providing for continuous introduction of the treating agent into the system, in which case adjustment of the amount of treating agent fed in may be regulated by the operator in such a way as to prevent froth formation to such an extent that froth does not appear in the tower exit gas.

In the following Example 1, the sulphuric acid solution used was obtained as a by-product of the hydrolysis of alkyl sulphates formed in the manufacture of alcohol from cracking still gas containing olefines. Prior to the treatment specified below, the weak sulphuric acid residue left after distilling out the alcohol was concentrated up to H2SO4 strength of 79.8% during which concentration no frothing difficulties were encountered.

In this specific example, 240 parts by weight of the 79.8% H2SO4 solution were charged into a concentrating vat equipped with an overflow for concentrated acid product, and 0.048 part by weight (0.02% by weight of the acid) of pure stearic acid were added while the acid was at room temperature. Concentration was effected by injecting a stream of hot air into the bottom of the acid mass in the vat. All during the concentration operation, a stream of the 79.8% acid was fed into the vat continuously and concentrated product acid ran out thru the overflow. Blowing with hot air, at temperature of about 220° C., was started and in about 15 minutes (9:30 a. m.) the temperature of the acid in the vat had risen to about 185° C. At this point slight frothing was noted, and from then until 10:15 a. m. 15 increments of 0.023 part by weight each of stearic acid were added at time intervals varying from 2 to 5 minutes. Temperature of the acid in the vat varied between 190 and 210° C. During this period frothing on the surface of the acid did not exceed about 1¼ inches. Frothing began to subside, and from 10:25 a. m. to 1:05 p. m. eight successive increments of 0.021 part by weight each of stearic acid were added at time intervals varying from 5 to 25 minutes. In this period the depth of the froth did not exceed about 1 inch. Acid temperature varied from 200–210° C. At 2 p. m. the acid strength in the vat was 90.8% $H_2SO_4$. Practically no frothing took place until about 3:40 p. m. at which time the froth rose to height of about one inch, and 0.021 part by weight of stearic acid were added. At 4:00 p. m. and 4:35 p. m., froth rose to height of about one inch and in each instance 0.021 part by weight of stearic acid were added. The run was completed at 4:55 p. m., at which time there was no frothing.

During the run 978 parts by weight of starting acid were continuously run into the vat making the total of acid treated of 1218 parts by weight of the initial 79.8% $H_2SO_4$ solution. Total addition of stearic acid during the run was 0.624 part by weight, equivalent to 0.05% by weight of the feed acid. As a result of the run, 1056 parts by weight of 90.6% $H_2SO_4$ sulphuric acid solution were obtained. There was a slight agglomeration of carbon at the acid inlet. With the exception of three very small areas in the side walls of the vat, all of the carbon was in a very finely divided state and there was no plugging of the acid outlet connection during the entire run. At the operating temperatures of about 200–210° C. frothing was kept within low controlled limits, and carbon agglomeration was reduced by 90–95%.

In following Example 2, the sulphuric acid solution subjected to concentration was the same as the 79.8% $H_2SO_4$ solution employed in Example 1. In the procedure of Example 2, 172 parts by weight of the 79.8% $H_2SO_4$ strength solution were charged into a concentrating vat provided with a product acid overflow, and 0.003 part by weight of cerotic acid were added while the sulphuric acid solution in the vat was at room temperature. Concentration was effected by injecting a stream of hot air, preheated to about 220° C., into the bottom of the vat. All during the concentration operation, a stream of the 79.8% acid was run into the vat continuously. At 9:10 a. m. continuous feeding of $H_2SO_4$ solution and blowing with hot air were commenced. At 9:17 a. m., temperature of the acid in the vat had risen to about 170° C. and a layer of froth about 2 inches deep had formed. At this point, 0.003 part by weight cerotic acid were added, and frothing subsided to form a froth layer about ½ inch thick. At 9:23 a. m., 9:25 a. m., and 9:33 a. m., 0.003 part by weight increments of cerotic acid were added, and on the 9:33 a. m., addition frothing ceased. The temperature of the acid mass had risen to 180° C. By 10:15 a. m., the acid in the concenrating vat analyzed 86.9% $H_2SO_4$. Continuous feed of sulphuric acid solution and heating at temperature of about 180° C. were continued until 12:45 p. m., at which time a layer of froth about ½ inch thick was formed and temperature dropped to about 160° C. At 1 p. m. 0.003 part by weight of cerotic acid were added to the inflowing acid stream outside the vat and for the next hour the depth of the froth did not exceed about ¾ of an inch. Concentration was continued at temperature of about 160° C., and at 3:15 p. m., 0.003 part by weight of cerotic acid were added to the inflowing acid stream. Thereafter to the end of the operation, at 4:20 p. m., temperature was held at about 160° C. and the thickness of the froth layer receded to about ½ an inch.

During the run, 884 parts by weight of starting acid were continuously run into the vat, making the total of acid treated of 1056 parts by weight of the initial 79.8% $H_2SO_4$ solution. The total addition of cerotic acid during the run was 0.024 part by weight, equivalent to 0.0023% by weight of the acid feed. As a result of the run, 963 parts by weight of sulphuric acid solution of 85.9% $H_2SO_4$ strength were obtained. On drawing the remaining concentrated acid out of the vat, after finishing the concentration operation, there was no carbon adhering to the vat walls. At operating temperatures of 150–180° C. frothing was easily kept within controlled limits.

In following Example 3, the sulphuric acid solution subjected to concentration was the same as the 79.8% $H_2SO_4$ solution employed in above Examples 1 and 2. In the procedure of Example 3, 172 parts by weight of the 79.8% $H_2SO_4$ strength solution were charged into a concentrating vat provided with a product acid overflow, and 0.0112 part by weight of pure bees-wax (understood to comprise chiefly an ester of myristic acid) were added while the sulphuric acid solution in the vat was at room temperature. Concentration was effected by injecting a stream of hot air, preheated to about 220° C., into the bottom of the vat. All during the concentration operation, a stream of the 79.8% acid was run into the vat continuously. At 9:05 a. m., continuous feeding of $H_2SO_4$ solution and blowing with air were commenced. At 9:13 a. m. the temperature of the acid in the vat had risen to about 175° C. and a layer of froth about 2 inches deep had formed. Then 0.0112 part by weight bees-wax were added to the vat, and the froth layer dropped to about ½ inch thick. At 9:14 a. m., 9:25 a. m., and 9:27 a. m., 0.0224, 0.0112, and 0.0224 part by weight respectively were added. By 9:25 a. m. the temperature of the acid in the vat had risen to about 180° C., and was maintained at this point until 12:50 p. m. After the 9:27 a. m. addition of bees-wax, the froth layer did not exceed about ¾ of an inch thick until 12:54 p. m. at which time 0.0112 part by weight of bees-wax were added to the inflowing acid at a point outside of the vat. At 10:10 a. m., the $H_2SO_4$ concentration of the acid in the vat was 86.4%. From 12:54 p. m. to 4 p. m., the end of the operation, temperature of the acid in the vat was held at about 160° C. At 1:55 p. m., 2 p. m., and 2:55 p. m., 0.0112 part by weight increments of bees-wax were added to the inflowing acid at a point outside the vat, and at no time subsequent to 1:55 p. m. did the thickness of the froth layer exceed 1¼ inches.

During the run, 927 parts by weight of starting acid were continuously fed into the vat making a total of acid treated of 1099 parts by weight of the initial 79.8% $H_2SO_4$ solution. Total addition of bees-wax during the run was 0.123 part by weight, equivalent to 0.0112% by weight of the acid feed. As a result of the run, 1001 parts by weight of sulphuric acid solution of 85.8% $H_2SO_4$ strength were obtained. A small amount, but not a complete ring, of agglomerated carbon formed on the walls of the concentrating vat above the froth line. At operating temperatures of 160–180° C., frothing was easily kept within controlled limits.

I claim:

1. In the concentration of impure sulphuric acid resulting from (1) sulphuric acid treatment of hydrocarbons of petroleum origin, (2) hydrolysis of at least some of the reaction products of said treatment, and (3) consequent formation of impure sulphuric acid containing organic froth promoting constituents, the steps comprising concentrating the impure acid, and maintaining in said acid while in the frothing stage, as a froth minimizer, a small amount of material of the group consisting of saturated fatty acids, their esters and salts.

2. In the concentration of impure sulphuric acid resulting from (1) sulphuric acid treatment of hydrocarbons of petroleum origin, (2) hydrolysis of at least some of the reaction products of said treatment, and (3) consequent formation of impure sulphuric acid containing organic froth promoting constituents, the steps comprising concentrating the impure acid, and maintaining in said acid while in the frothing stage, as a froth minimizer, a small amount of saturated fatty acid.

3. In the concentration of impure sulphuric acid resulting from (1) sulphuric acid treatment of hydrocarbons of petroleum origin, (2) hydrolysis of at least some of the reaction products of said treatment, and (3) consequent formation of impure sulphuric acid containing organic froth promoting constituents, the steps comprising concentrating the impure acid, and maintaining in said acid while in the frothing stage, as a froth minimizer, a small amount of stearic acid.

4. In the operation of heating impure sulphuric acid resulting from (1) sulphuric acid treatment of hydrocarbons of petroleum origin, (2) hydrolysis of at least some of the reaction products of said treatment, and (3) consequent formation of impure sulphuric acid containing organic froth promoting constituents, the improvement comprising maintaining in said acid when heating the same while in the frothing stage, as a froth minimizer, a small amount of material of the group consisting of saturated fatty acids, their esters and salts.

5. In the operation of heating impure sulphuric acid containing organic froth promoting constituents, the improvement comprising maintaining in said acid when heating the same while in the frothing stage, as a froth minimizer, a small amount of material of the group consisting of saturated fatty acids, their esters and salts.

6. In the concentration of impure sulphuric acid containing organic froth promoting constituents, the steps comprising concentrating the impure acid, and maintaining in said acid while in the frothing stage, as a froth minimizer, a small amount of material of the group consisting of saturated fatty acids, their esters and salts.

7. In the concentration of impure sulphuric acid resulting from (1) hydrolysis of alkyl sulphates, and (2) consequent formation of impure sulphuric acid containing organic froth promoting constituents, the steps comprising concentrating the impure acid, and maintaining in said acid while in the frothing stage, as a froth minimizer, a small amount of material of the group consisting of saturated fatty acids, their esters and salts.

8. In the concentration of impure sulphuric acid resulting from (1) hydrolysis of alkyl sulphates produced in the manufacture of alcohol from olefines and (2) consequent formation of impure sulphuric acid containing organic froth promoting constituents, the steps comprising concentrating the impure acid, and maintaining in said acid while in the frothing stage as a froth minimizer, a small amount of stearic acid.

JOHN V. SHINN.